United States Patent
Li et al.

(10) Patent No.: US 11,379,963 B2
(45) Date of Patent: Jul. 5, 2022

(54) INFORMATION PROCESSING METHOD AND DEVICE, CLOUD-BASED PROCESSING DEVICE, AND COMPUTER PROGRAM PRODUCT

(71) Applicant: CloudMinds (Shanghai) Robotics Co., Ltd., Shanghai (CN)

(72) Inventors: Ye Li, Shenzhen (CN); Shiguo Lian, Shenzhen (CN)

(73) Assignee: CloudMinds Robotics Co., Ltd., Shanghai (CN)

( * ) Notice: Subject to any disclaimer, the term of this patent is extended or adjusted under 35 U.S.C. 154(b) by 337 days.

(21) Appl. No.: 16/609,447

(22) PCT Filed: Jan. 10, 2018

(86) PCT No.: PCT/CN2018/072132
§ 371 (c)(1),
(2) Date: Oct. 29, 2019

(87) PCT Pub. No.: WO2019/136641
PCT Pub. Date: Jul. 18, 2019

(65) Prior Publication Data
US 2020/0090323 A1 Mar. 19, 2020

(51) Int. Cl.
*G06T 7/00* (2017.01)
*G06T 7/50* (2017.01)
(Continued)

(52) U.S. Cl.
CPC .......... *G06T 7/0002* (2013.01); *G06T 5/002* (2013.01); *G06T 5/20* (2013.01); *G06T 7/11* (2017.01);
(Continued)

(58) Field of Classification Search
None
See application file for complete search history.

(56) References Cited

U.S. PATENT DOCUMENTS

| | | | |
|---|---|---|---|
| 2013/0141578 A1* | 6/2013 | Chundrlik, Jr. | B60H 1/00771 348/148 |
| 2018/0182109 A1* | 6/2018 | Sun | G06T 7/246 |
| 2019/0187704 A1* | 6/2019 | Gordon | G01C 21/3484 |

FOREIGN PATENT DOCUMENTS

| | | |
|---|---|---|
| CN | 104200453 A | 12/2014 |
| CN | 104463145 A | 3/2015 |

(Continued)

OTHER PUBLICATIONS

Li, Wei, et al. "Three-dimensional pavement crack detection algorithm based on two-dimensional empirical mode decomposition." Journal of Transportation Engineering, Part B: Pavements 143.2 (2017): 04017005. (Year: 2017).*

(Continued)

*Primary Examiner* — David Perlman
(74) *Attorney, Agent, or Firm* — McCoy Russell LLP

(57) ABSTRACT

An information processing method, device, cloud-based processing device, and computer program product are related to the field of data processing technologies and can cause an increased efficiency in detecting whether a road area contains a depression region. The information processing method includes: acquiring a depth image; processing the depth image to obtain a means-by-row graph, based on which a road area in the depth image is determined; determining a suspected depression region in the road area; and judging over the suspected depression region based on a depression threshold to determine whether the depth image contains a depression region.

18 Claims, 10 Drawing Sheets

(51) Int. Cl.
    *G06T 7/11*   (2017.01)
    *G06T 5/00*   (2006.01)
    *G06T 5/20*   (2006.01)
(52) U.S. Cl.
    CPC ...... *G06T 7/50* (2017.01); *G06T 2207/10028* (2013.01); *G06T 2207/20024* (2013.01)

(56) References Cited

FOREIGN PATENT DOCUMENTS

| CN | 104899869 A | 9/2015 |
|---|---|---|
| CN | 106597690 A | 4/2017 |
| CN | 106843491 A | 6/2017 |
| CN | 206460410 U | 9/2017 |
| CN | 107341789 A | 11/2017 |
| JP | 2014106897 A | 6/2014 |
| JP | 2017138238 A | 8/2017 |

OTHER PUBLICATIONS

Moazzam, Imran, et al. "Metrology and visualization of potholes using the microsoft kinect sensor." 16th International IEEE Conference on Intelligent Transportation Systems (ITSC 2013). IEEE, 2013. (Year: 2013).*

Ryu, Seung-Ki, Taehyeong Kim, and Young-Ro Kim. "Feature-based pothole detection in two-dimensional images." Transportation Research Record 2528.1 (2015): 9-17. (Year: 2015).*

Mohammad R. Jahanshahi et al: "Unsupervised Approach for Autonomous Pavement-Defect Detection and Quantification Using an Inexpensive Depth Sensor", Journal of Computing in Civil Engineering, vol. 27, No. 6, Nov. 1, 2013 (Nov. 1, 2013), pp. 743-754, XP055693452, US ISSN: 0887-3801, DOI: 10.1061/(ASCE) CP. 1943-5487.0000245 section "Defect Detection"; figures 2,3,7.

Lokeshwor Huidrom et al: "Method for Automated Assessment of Potholes, Cracks and Patches from Road Surface Video Clips", PROCEDIA—Social and Behavioral Sciences, vol. 104, Dec. 2, 2013 (Dec. 2, 2013), pp. 312-321, XP55694022, ISSN: 1877-0428, DOI: 10.1016/j. sbspro.2013.11.124 section 2.2; p. 315.

Supplementary European Search Report in the European application No. 18899638.3, dated May 20, 2020.

English Translation of the Written Opinion of the International Search Authority in the international application No. PCT/CN2018/072132, dated Oct. 18, 2018.

First Office Action of the Japanese application No. 2019-559815, dated Nov. 25, 2020.

International Search Report in the international application No. PCT/CN2018/072132, dated Oct. 18, 2018.

First Office Action of the Chinese application No. 201880000099.1, dated Sep. 17, 2019.

* cited by examiner

Sensor coordinate system: $O_c\text{-}X_cY_cZ_c$;
World coordinate system: $O_w\text{-}X_wY_wZ_w$;

INFORMATION PROCESSING METHOD AND DEVICE, CLOUD-BASED PROCESSING DEVICE, AND COMPUTER PROGRAM PRODUCT

CROSS-REFERENCE TO RELATED APPLICATIONS

The present application is a national stage entry application of international application number PCT/CN2018/072132 filed on Jan. 10, 2018, the disclosure of which is hereby incorporated by reference in its entirety.

TECHNICAL FIELD

The present disclosure relates to the field of data processing technologies, and specifically to an information processing method and device, a cloud-based processing device, and a computer program product.

BACKGROUND

With the rapid development of the Internet of Things (IoTs) technologies, pervasive computing, holographic computing, cloud computing and other new models of data computing have been gradually stepping into our daily lives, and have been applied to a variety of fields, among which computer vision is a representative field. Computer vision is a branch of science that studies how to make a machine "see". To be more specific, it is machine vision utilizing a device to substitute human eyes to recognize, track, and measure a target. Then image processing is further performed, using a processor to process the data thus obtained into images that are more suitable for human eyes to observe, or are transmitted to an instrument for detection.

In practical applications, machine vision can be applied in many scenarios. For example, machine vision can be applied to a guiding stick, which is used to avoid obstacles in front of a visually impaired person. In another example, machine vision can be applied in the field of navigation, which is used to detect a road and obstacles on the surface of the road.

Most of the existing technologies, however, rely on the information that is detected, such as color and shape, etc., and rely on the segmentation and contrast of strong edge information, so as to determine the shape of an object. Yet the detection of depressions or pits, or objects below the horizontal line typically has a relatively low accuracy.

SUMMARY

Embodiments of the present disclosure provide an information processing method, device, cloud-based processing device, and computer program product, which relate to the field of data processing technologies and can cause an increased efficiency in detecting whether a road area contains a depression region.

In a first aspect, embodiments of the present application provide an information processing method, which includes:
acquiring a depth image;
processing the depth image to obtain a means-by-row graph, and determining a road area in the depth image based on the means-by-row graph;
determining a suspected depression region in the road area; and
judging over the suspected depression region based on a depression threshold to determine whether the depth image contains a depression region.

In a second aspect, embodiments of the present application further provide an information processing device, which includes:
an acquisition unit, configured to acquire a depth image;
a processing unit, configured to process the depth image to obtain a means-by-row graph, and then to determine a road area in the depth image based on the means-by-row graph;
a determination unit, configured to determine a suspected depression region in the road area; and
a judgment unit, configured to judge over the suspected depression region based on the depression threshold to thereby determine whether the depth image contains a depression region.

In a third aspect, embodiments of the present application further provide a cloud processing device, which includes a processor and a memory. The memory is configured to store instructions which, when executed by the processor, cause the device to execute the method according to any one of embodiments provided in the first aspect of the present disclosure.

In a fourth aspect, embodiments of the present application further provide a
computer program product capable of being directly loaded into an internal memory of a computer, which comprises software codes which, after being loaded and executed by the computer, cause the computer to realize the method according to any one of embodiments provided in the first aspect of the present disclosure.

In the information processing method and device, the cloud-based processing device, and the computer program product disclosed in the various embodiments of the present application, a depth image is acquired and processed. Firstly, a road area in the depth image can be determined according to row means of the depth image; then a suspected depression region in the road area can be determined; and finally, the suspected depression region can be judged over based on a depression threshold to thereby determine whether the depth image contains a depression region. The technical solutions provided by the embodiments of this application can effectively judge whether there is a depression region on a road surface. The detection efficiency is high and the calculation speed is fast. It can solve the problems of low accuracy in detecting depressions or objects below the horizontal line associated with the existing technologies.

BRIEF DESCRIPTION OF DRAWINGS

In order to more clearly describe the technical solutions or schemes that are disclosed in embodiments of this present application or in existing technologies, some drawings that accompany some embodiments of this present application or some existing technologies are briefly described herein. It is obvious that these accompanying drawings as described in the following represent some illustrating examples of the embodiments of the present application. People of ordinary skills in the field can, in the premise of not paying creative labor, also obtain other drawings based on these drawings.

DETAILED DESCRIPTION

In order to make the goal, the technical solution, and the advantages provided in the embodiments of the present disclosure clearer, in the following a detailed and complete description is further provided for some illustrating embodiments which are accompanied with drawings. It is obvious that the embodiments described herein represent only part of, and do not exhaustively cover all of, the embodiments of this disclosure. Based on these embodiments disclosed in the present application, all other embodiments, as long as they can be acquired by a person of ordinary skill in the field without making creative work, shall fall within the scope of the protection of the present application.

The terminologies used in the embodiments of this present disclosure are for the purpose of describing the particular embodiment only, and are not intended to impose any limitation thereto. Any singular forms, such as "a", "an", "one", "the", and "said", if used in the embodiments of the disclosure and in the claims that are appended therewith, are also intended to include their plural forms, unless the context clearly indicates otherwise.

It should be understood that the term "and/or" in this disclosure is used only to describe the relationship between associated objects, and indicates that there can be three kinds of relationships. In one example of A and/or B, it can be expressed as: A alone, A and B together, and B alone. In addition, the character "/" throughout this disclosure generally indicates that the relationship between one object that precedes and another object that follows is an "or" relationship.

Depending on the context, the phrase "if . . . " as used in the disclosure can be interpreted as "in situation where . . . ", "when . . . ", or "in response to the determination that . . . ", or "upon detecting . . . ". Similarly, depending on the context, the phrase "if determining . . . " or "if detecting . . . (condition or event under statement)" can be interpreted as "when determining . . . " or "in response to the determination that . . . " or "when detecting . . . (condition or event under statement)" or "in response to detection that . . . (condition or event of statement)".

Figure 1:
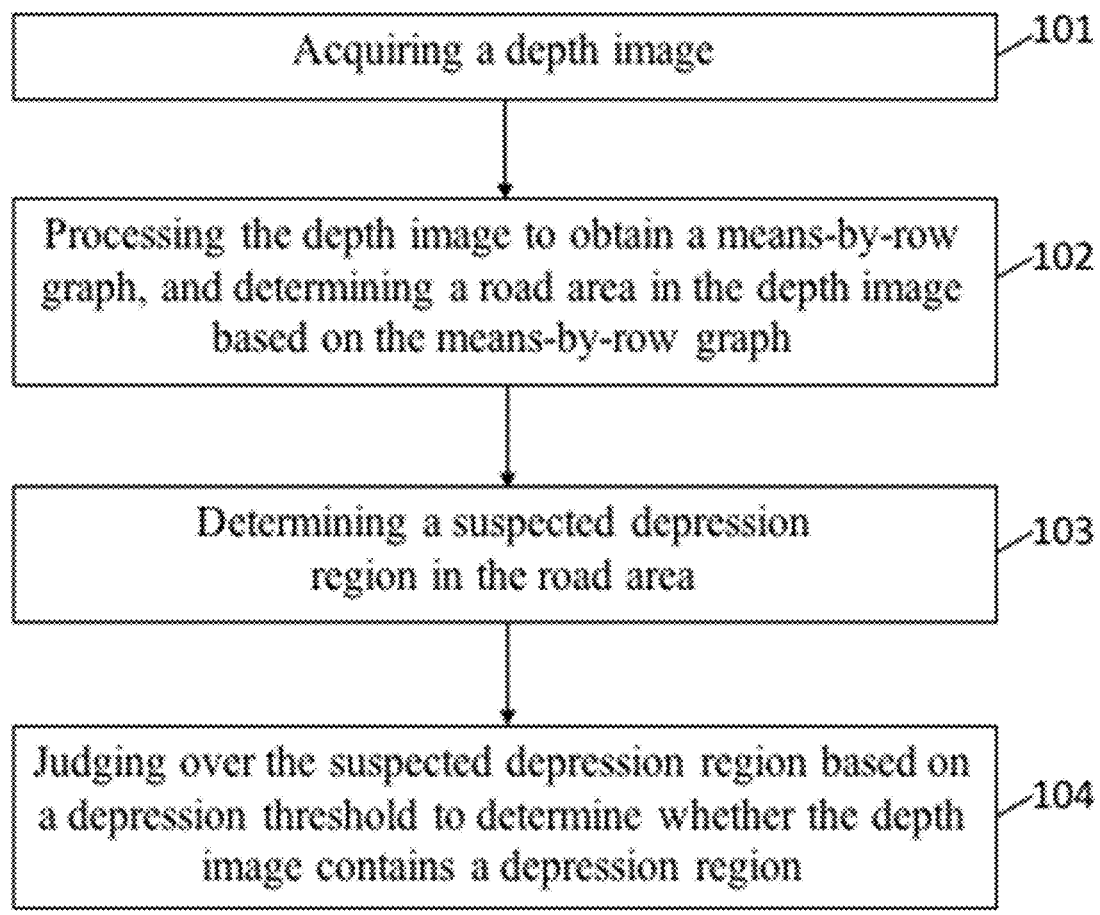
FIG. 1 is a flow chart of an information processing method provided by some embodiments of the disclosure.

In existing technologies, machine vision can be applied in many scenarios. For example, machine vision can be applied to a guiding stick, or can be applied to the field of navigation, whereas in detecting a road surface, it is most commonly used for the road surface detection or obstacle detection. Moreover, in the detection process using a seed point region growing method, a random point least-square method, a mean block height method, a V-disparity algorithm, etc., there are issues or problems such as complex calculations, and vulnerability to impacts from samples and actual environments such that the accuracy of results is influenced, the recognition efficiency is low, and the detection range is limited. As such, embodiments of the present disclosure provide an information processing method, which utilizes the depth images that are obtained or acquired to detect whether there are depressions on the road surface. This method has a high detection efficiency, and can thus be applied to many scenarios such as assisting a visually impaired person to move, obstacle avoidance by robots, unmanned driving, and navigation, etc. Specifically, FIG. 1 illustrates a flow chart of an information processing method provided by some embodiments of the disclosure. As shown in FIG. 1, the information processing method includes the following steps:

101: acquiring a depth image.

Figure 2:
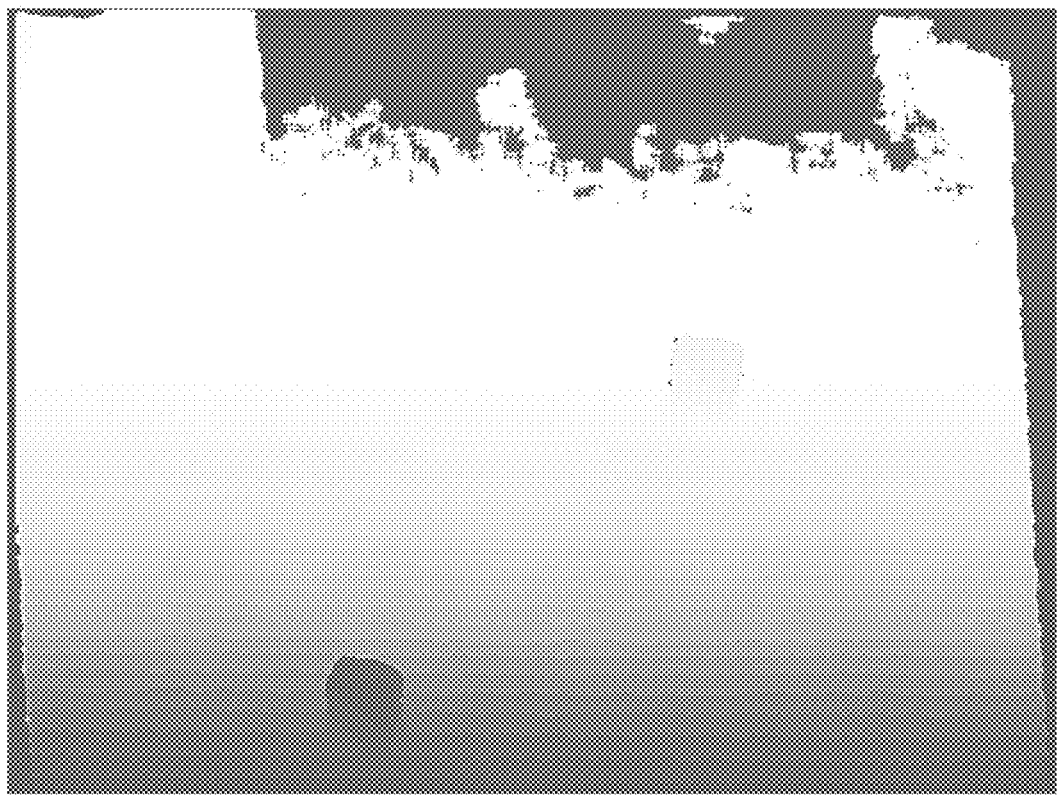
FIG. 2 is a diagram of a first scene using the information processing method provided by some embodiment of the disclosure.

In some embodiments of this application, the depth image can be obtained or acquired by means of a depth sensor, which takes photographs of an object in a real-time manner, as shown in FIG. 2, which illustrates a schematic diagram of a first scene using the information processing method provided by some embodiments of the disclosure. The depth image may also have already been taken and then be acquired. In one example, a user can upload a depth image to a processing device. In another example, a specified depth image can be acquired in a depth image library.

Specifically, according to some embodiments of the disclosure, a depth sensor (i.e. a depth camera) can generally include three types: a three-dimensional sensor based on structured lights, such as Kinect, RealSense, LeapMotion, Orbbec, etc., a three-dimensional sensor based on binocular stereo vision, such as ZED, Inuitive, Human+Director, etc., or a depth sensor based on the TOF principle, such as PMD, Panasonic, etc.

Through the above approaches, the depth image can be acquired for subsequent detection to determine whether the current image contains a depression region. It is understandable that in these embodiments of the present application, the depression region can exist on a road surface, and that in practical applications, it is not limited to the road surface, and can also be in other scenarios, such as in an indoor situation.

102. Processing the depth image to obtain a means-by-row graph, and determining a road area in the depth image based on the means-by-row graph.

Figure 3:
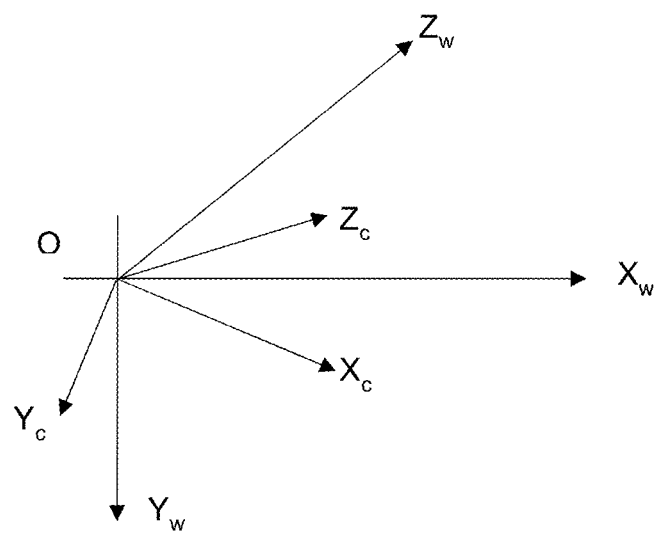
FIG. 3 is a schematic diagram of a world coordinate system provided by some embodiments of this disclosure.

In the embodiments of this application disclosed herein, when a depth sensor is used to capture the depth image in the real-time manner, a camera/sensor coordinate system can be first converted to a world coordinate system through coordinate transformation of the depth image. FIG. 3 is a schematic diagram of a world coordinate system provided by some embodiments of this disclosure. As specifically shown in FIG. 3, an optical center of the depth sensor is used as an origin of the world coordinate system, a horizontally rightward direction is chosen as a positive direction of an X axis, a vertically downward direction is chosen as a positive direction of a Y axis, and a forward direction that is perpendicular to the plane is chosen as a positive direction of a Z axis, such that a world coordinate system is established. Because the origin of the world coordinate system coincides with the origin of the depth sensor coordinate system, there is only a rotation relationship between the two coordinate systems, there is also no translation relationship, and there is furthermore no relationship among the pixel coordinate system, the camera coordinate system and the world coordinate system. As such, based on an attitude angle of the depth sensor, a point $P(X_c, Y_c, Z_c)$ in the depth sensor coordinate system can be converted to a point $P(X_w, Y_w, Z_w)$ in the world coordinate system. The calculation formulas are as follows:

$$\begin{bmatrix} X_w \\ Y_w \\ Z_w \end{bmatrix} = \begin{bmatrix} \cos\gamma & -\sin\gamma & 0 \\ \sin\gamma & \cos\gamma & 0 \\ 0 & 0 & 1 \end{bmatrix} * \begin{bmatrix} \cos\beta & 0 & \sin\beta \\ 0 & 1 & 0 \\ -\sin\beta & 0 & \cos\beta \end{bmatrix} *$$

$$\begin{bmatrix} 1 & 0 & 0 \\ 0 & \cos\alpha & -\sin\alpha \\ 0 & \sin\alpha & \cos\alpha \end{bmatrix} * \begin{bmatrix} X_c \\ Y_c \\ Z_c \end{bmatrix} \begin{bmatrix} u \\ v \\ 1 \end{bmatrix} = \frac{1}{Z_c} M_{3\times 4} \begin{bmatrix} X_c \\ Y_c \\ Z_c \\ 1 \end{bmatrix}$$

Herein, u, v are the coordinate values of the point P in the pixel coordinate system, $X_c$, $Y_c$ and $Z_c$ are the coordinate values of the point P in the camera coordinate system, $X_w$ is the X-axis coordinate value of each pixel in the image in the world coordinate system, $Y_w$ is the Y-axis coordinate value of each pixel in the image in the world coordinate system, and $Z_w$ is the Z-axis coordinate value of each pixel in the image in the world coordinate system; α, β and γ describe the attitude angle of the depth sensor, respectively representing a rotation angle of the X, Y and Z axes of the depth sensor around the X, Y and Z axes of the world coordinate system. $X_c$ is the X-axis coordinate value of each pixel in the depth sensor coordinate system of the image; $Y_c$ is the Y-axis coordinate value of each pixel in the depth sensor coordinate system of the image; and $Z_c$ is the Z-axis coordinate value of each pixel in the depth sensor coordinate system of the image; $M_{3\times 4}$ is the camera's internal reference matrix.

In the embodiments of this present application, an image comprising $Z_w$ is the depth image in the world coordinate system.

Then the depth image in the world coordinate system is processed, and a mean value of each row is calculated to thereby obtain a means-by-row graph. In the embodiments of this application, in order to improve the computational efficiency, the depth image in the world coordinate system can be preprocessed. In one specific implementation process, the preprocessing may include smoothing, filtering, denoising, and so on. Then based on the characteristics that a same row in the depth image of a ground/road surface has a similar depth value, a mean value of pixels in each row of pixels in the depth image can be calculated, and then based on a number of each row and a mean value corresponding to the each row, a means-by-row graph $I_{rowsMean}$ can be established.

Then, the means-by-row graph is processed to determine a suspected road area. Specifically, because the road surface has certain characteristics, regarding the $Z_w$ of the world coordinate system, the bottom-to-top direction thereof usually represents a near-to-far road surface, which has the characteristics of being monotonously increasing. As such, in the means-by-row graph $I_{rowsMean}$, the row mean values that are not monotonously increasing in the bottom-to-top direction can be first removed, and the remaining row mean values can be next filtered by lone points, and the micro-fault zones can then be connected to thereby obtain a preprocessed result. After the preprocessed result is obtained, the suspected road area in the depth image can be filtered according to the preprocessed result. Specifically, in the depth image that has been preprocessed, a row in which the median of a column vector for the row mean is 0 can be set as 0. Then each pixel position, if a difference between a depth value of the each pixel in the depth image and a corresponding value of the column vector for a row mean is greater than or equal to a preset level of tolerance for road undulation, is set as 0; and each pixel position in the depth image having values of not zero is determined as the suspected road area.

Finally, the suspected road area is judged based on a preset position threshold of the main plane to thereby determine the road area in the depth image. Specifically, a selection strategy can be set in advance. For example, an area with a largest area and with a distance from the lowest position of the suspected road area to the lowest position of the depth map $Z_w$ not exceeding $\varepsilon_{rows}$ can be selected. Specifically, it can be set that:

$$\varepsilon_{rows} < 5\% \cdot H_{Zw};$$

Herein, $\varepsilon_{rows}$ represents a threshold value for the position of the main plane, $H_{Zw}$ represents a height of the depth image $Z_w$.

103. Determining a suspected depression region in the road area.

According to some embodiments of the present application, the process of determining a suspected depression region in a road area can be as follows:

Firstly, a mean value for each row in the road area is calculated. Because there are some error factors in the road area, the road area can be preprocessed in advance. In a specific implementation process, the preprocessing can include smoothing, filtering, denoising and other processing. Next, the mean value for each row of the preprocessed road area can be calculated. The specific calculation method can be referenced to the description as mentioned above.

Then, a band-stop filter is established. According to some embodiments of this application, the formula of the band-stop filter is as follows:

$$Z_{wGnd}(i, j) = \begin{cases} 0, & |Z_{wGnd}(i, j) - I_{rowsMeanGnd}(i)| \leq \delta \\ Z_{wGnd}(i, j), & |Z_{wGnd}(i, j) - I_{rowsMeanGnd}(i)| > \delta \end{cases}$$

Herein, $Z_{wGnd}(i, j)$ is the depth value of the depth image corresponding to the road area at the coordinates (i, j), and $I_{rowsMeanGnd}(i)$ is the mean value of the depth image corresponding to the road area at the row i; and δ is the preset level of tolerance for depressions on the road surface.

It is noted that in practical implementation, the setting of the value of δ is related to the depth sensor used and to the actual road condition. If the value is set as too small, there will be relatively more false positives. If the value is set as too large, there will be relatively more false negatives, which is not beneficial to subsequent processing. Therefore, in combination with a large number of experimental data and empirical values, the range of δ is usually between [5, 30].

Figure 4:
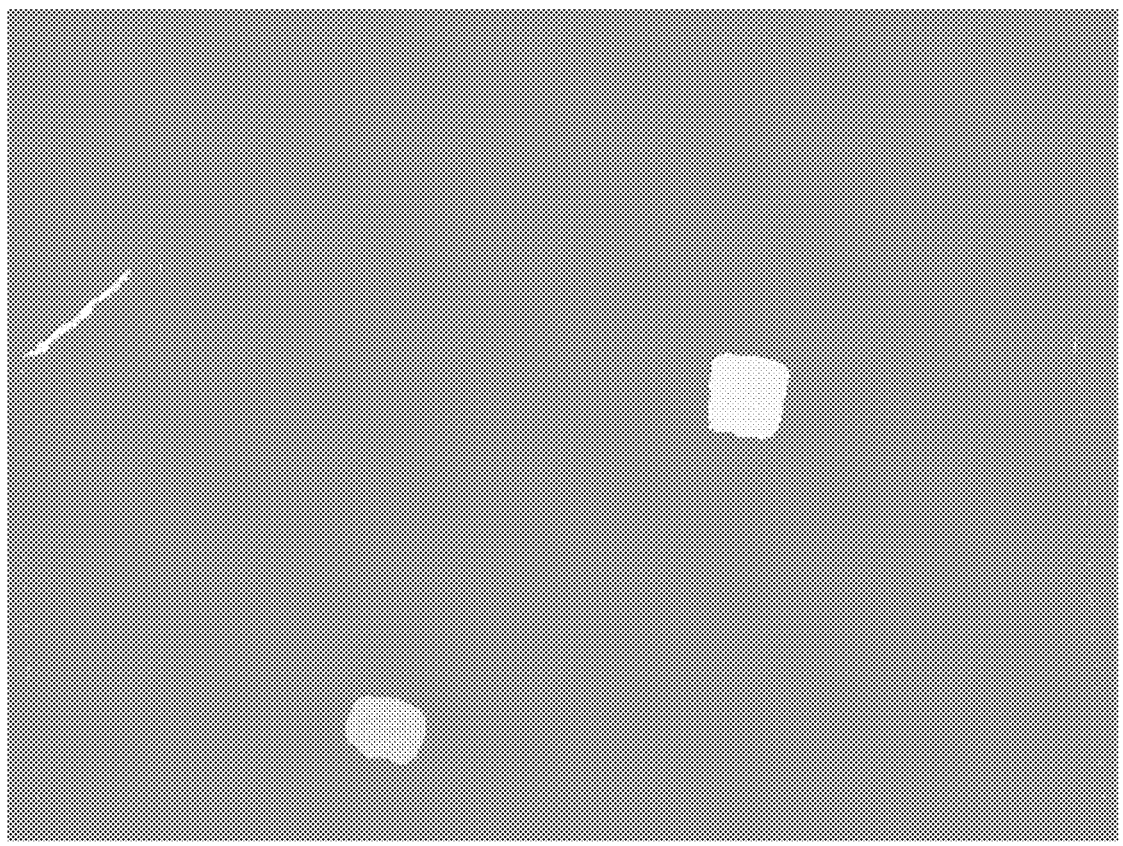
FIG. 4 is a diagram of a second scene using the information processing method provided by some embodiment of the disclosure.

Finally, the row means can be filtered using a band-stop filter to obtain a suspected depression region as shown in FIG. 4, which illustrates a diagram of a second scene using the information processing method provided by some embodiment of the disclosure. After the row means have been filtered with the above formulas, the set of $Z_{wGnd}(i, j)$ thus obtained is the suspected depression region.

104. Judging over the suspected depression region based on a depression threshold to determine whether the depth image contains a depression region.

In the embodiments of the application disclosed herein, firstly, the suspected depression region is preprocessed. Specifically, the preprocessing treatments, such as binarization and morphological processing, etc., can be performed over the suspected depression region to thereby remove the influence of burrs and islands on the subsequent extraction of depression edges.

Then, the contour of the suspected depression region $C_{pothole}$ is extracted, and the contour is used as a candidate depression region.

Next, the area of the candidate depression region is calculated. In the embodiments disclosed herein, the area of the candidate depression region is set as $S_{pothole}$. In practical application, besides the conventional calculation method, the Xw values: XwR, XwL, that correspond respectively to the right-most value and the left-most value of the candidate depression region, and the Zw values: ZwT, ZwB, that correspond respectively to the upper-most (i.e. top) value and the lower-most (i.e. bottom) value of the candidate depression region, can be utilized, such that an area of a rectangular box comprising XwR, XwL, ZwT, and ZwB can be used for substitution.

Finally, when the area of the candidate depression region is larger than an area threshold, it is determined that the depth image contains a depression region. In the embodiments of this application disclosed herein, the area threshold is set as ε, then if $S_{pothole} > \varepsilon$, the candidate depression region is determined to be a depression region, and the depth image acquired at the moment by the depth sensor contains a depression region.

It is noted that in practical application, the setting of the value of E is related to the depth sensor that is used and the actual road condition. If the value is too small, there will be relatively more false positives. If the value is too large, there will be relatively more false negatives. Therefore, in combination with a large number of experimental data and empirical values, the value range can usually be between [100, 400].

The information processing method provided in the embodiments of this disclosure processes the acquired depth image. Firstly, a road area in a depth image can be determined based on the row means of the depth image; then, a suspected depression region in the road area can be determined; finally, the suspected depression region can be judged based on a depression threshold to determine whether the depth image contains a depression region. The technical solutions provided by the embodiments of this application can effectively judge whether there is a depression region on a road surface. The detection efficiency is high and the calculation speed is fast. It can solve the problems of low accuracy in detecting depressions or objects below the horizontal line associated with the existing technologies.

Figure 5:
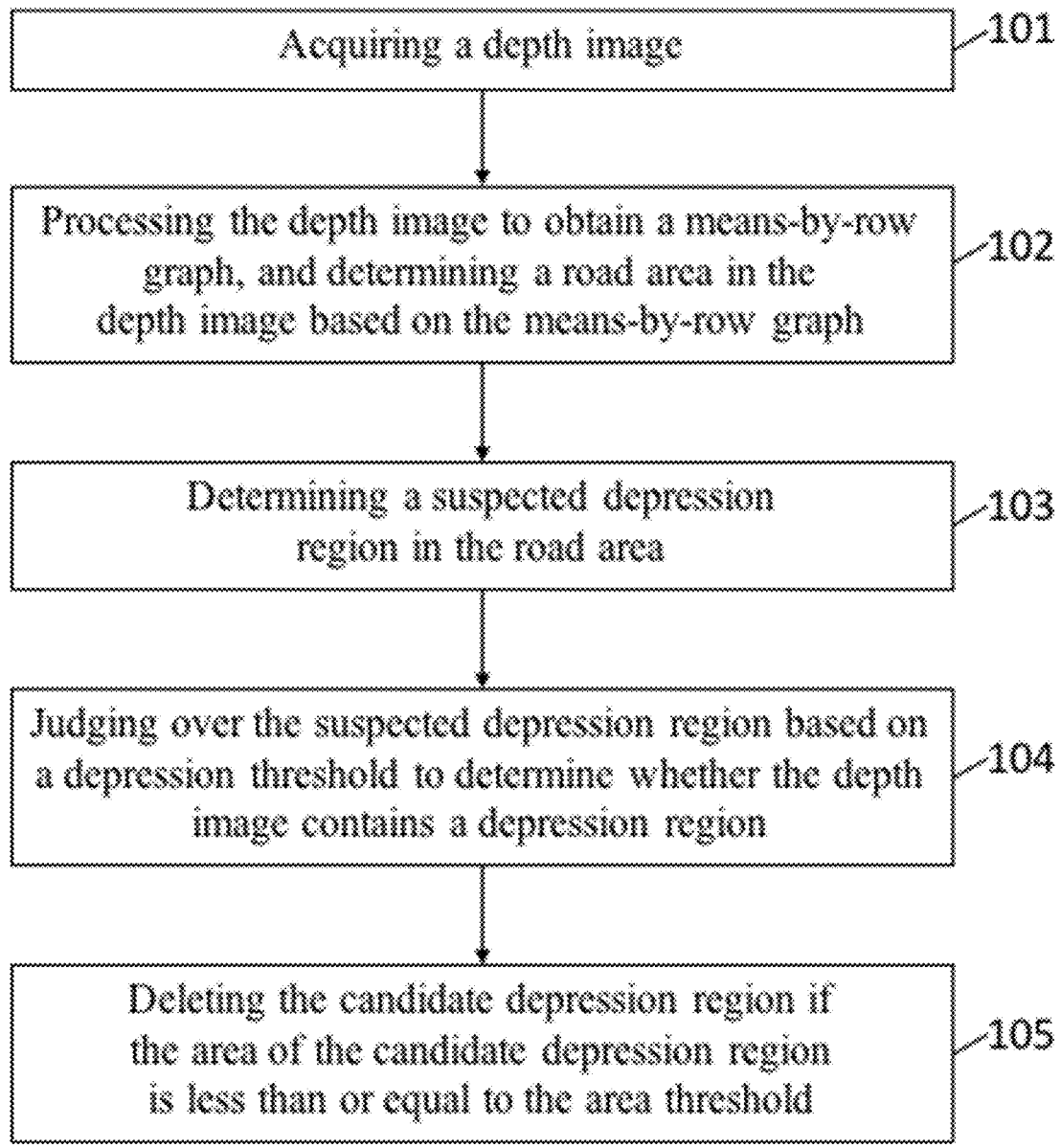
FIG. 5 illustrates a flow chart of an information processing method provided by another embodiment of the disclosure.

On the basis of the disclosure as set forth above, in order to reduce the pressure on the buffer and improve the calculation speed, when judging over the suspected depression region based on the depression threshold, the following operations can be performed over the depth image determined to be absent of a depression region. Specifically, FIG. 5 shows another flow chart of an information processing method provided by some embodiments of the disclosure. As shown in FIG. 5, the embodiments of the information processing method can further include the following step:

105. Deleting the candidate depression region if the area of the candidate depression region is less than or equal to the area threshold.

In the embodiments disclosed herein, the area of the candidate depression region is set as $S_{pothole}$, and the area threshold is set as E. Then if $S_{pothole} \leq \varepsilon$, the candidate depression region is determined as a non-depression region, and the candidate depression region can be deleted.

Figure 6:
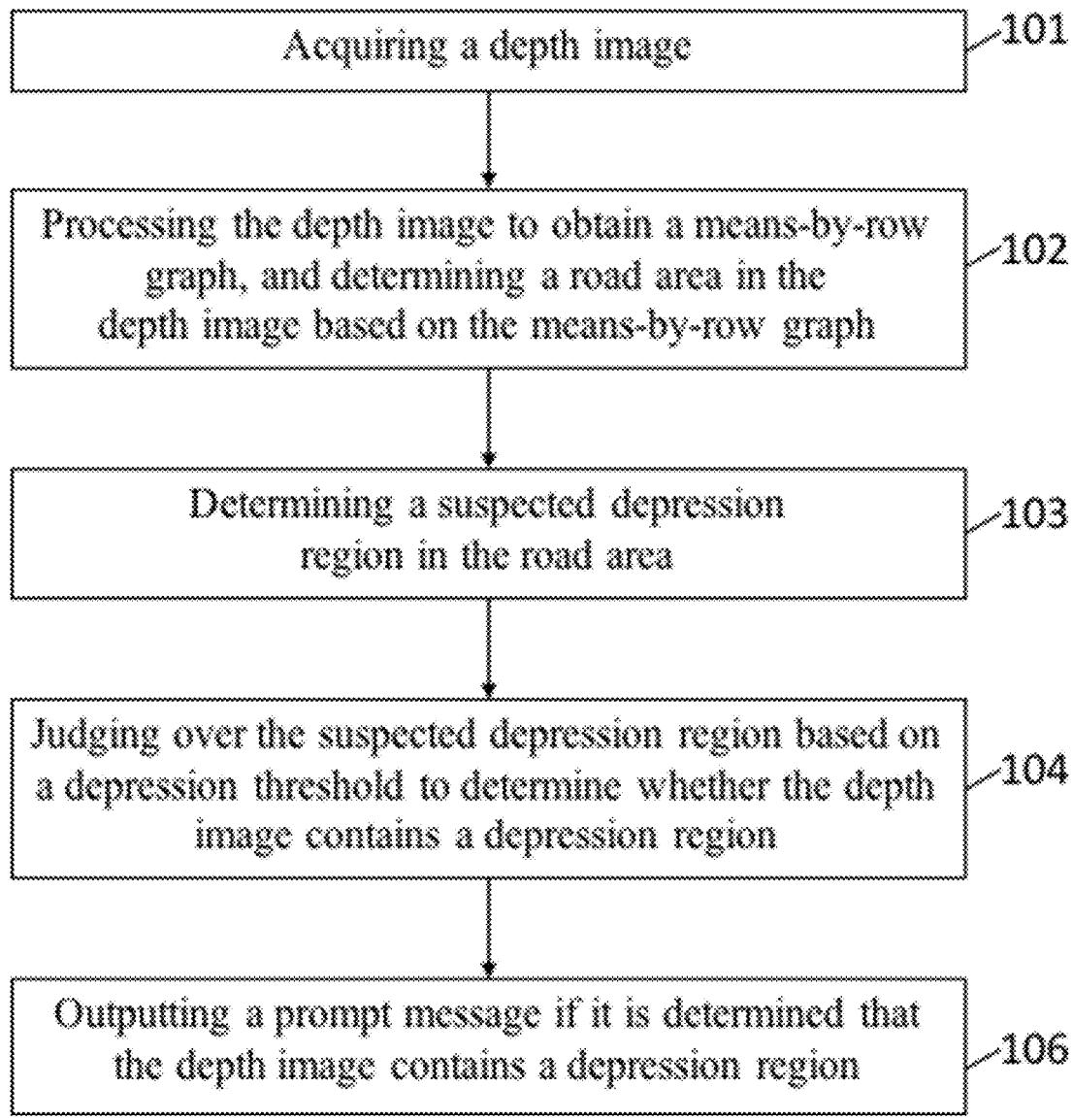
FIG. 6 illustrates a flow chart of an information processing method provided by yet another embodiment of the disclosure.

In the above description, the process of determining a depression region is provided. When the scheme provided in the embodiments of this application is applied in an actual product, it can be further configured to provide a prompting effect to a user. Specifically, FIG. 6 shows yet another flow chart of an information processing method provided by some embodiments of the disclosure. As shown in FIG. 6, the information processing method further includes the following step:

106. Outputting a prompt message if it is determined that the depth image contains a depression region.

In the embodiments of this application disclosed herein, if it is determined that the acquired depth image contains a depression region, a detection module of the product can feed or transmit parameters to a corresponding prompting module, so that the prompting module can output a prompt message. In a specific implementation, the prompt message can include voice information, vibration information, text information, sound information, optical light information, etc.

Figure 7:
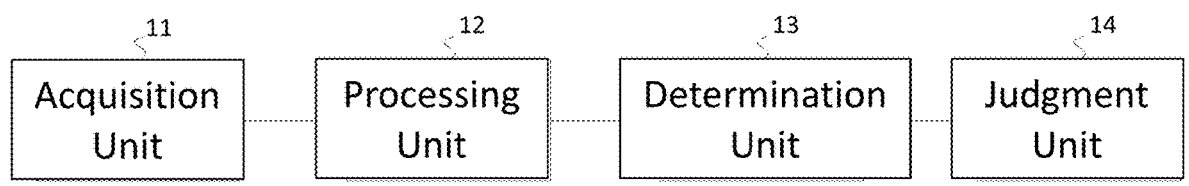
FIG. 7 is a schematic diagram illustrating a structure of an information processing device according to some embodiment of the disclosure.

In order to realize the information processing method as described above, embodiments of this application further provide an information processing device. FIG. 7 is a schematic diagram illustrating a structure of an information processing device according to some embodiment of the disclosure. As shown in FIG. 7, the embodiments of the device include: an acquisition unit 11, a processing unit 12, a determination unit 13 and a judgment unit 14.

The acquisition unit 11 is configured to acquire a depth image.

The processing unit 12 is configured to process the depth image to obtain a means-by-row graph, and then to determine a road area in the depth image based on the means-by-row graph.

The determination unit 13 is configured to determine a suspected depression region in the road area.

The judgment unit 14 is configured to judge over the suspected depression region based on the depression threshold to thereby determine whether the depth image contains a depression region.

In a specific implementation process, the depth image can be an image under a camera/sensor coordinate system.

The processing unit 12 can be specifically configured:

to perform a coordinate transformation over the depth image to thereby convert the camera coordinate system into a world coordinate system;

to process the depth image in the world coordinate system, and calculate row means therein to thereby obtain a means-by-row graph;

to process the means-by-row graph to determine a suspected road area; and to judge over the suspected road area based on a preset position threshold of a main plane to determine the road area in the depth image.

In a specific implementation process, the determination unit 13 is configured:

to calculate row means in the road area;

to establish a band-stop filter; and to filter the row means by means of the band-stop filter to thereby obtain the suspected depression region.

In a specific implementation process, the judgment unit 14 is specifically configured:

to preprocess the suspected depression region;

to extract a contour of the suspected depression region and regard the contour as a candidate depression region;

to calculate an area of the candidate depression region; and to determine, if the area of the candidate depression region is larger than an area threshold, that the depth image contains a depression region.

The information processing device provided in the embodiments of this application can be used to implement the technical scheme of the information processing method as shown in FIG. 1. Because the implementation principle and technical effects are similar, the description thereof is not repeated herein.

Figure 8:
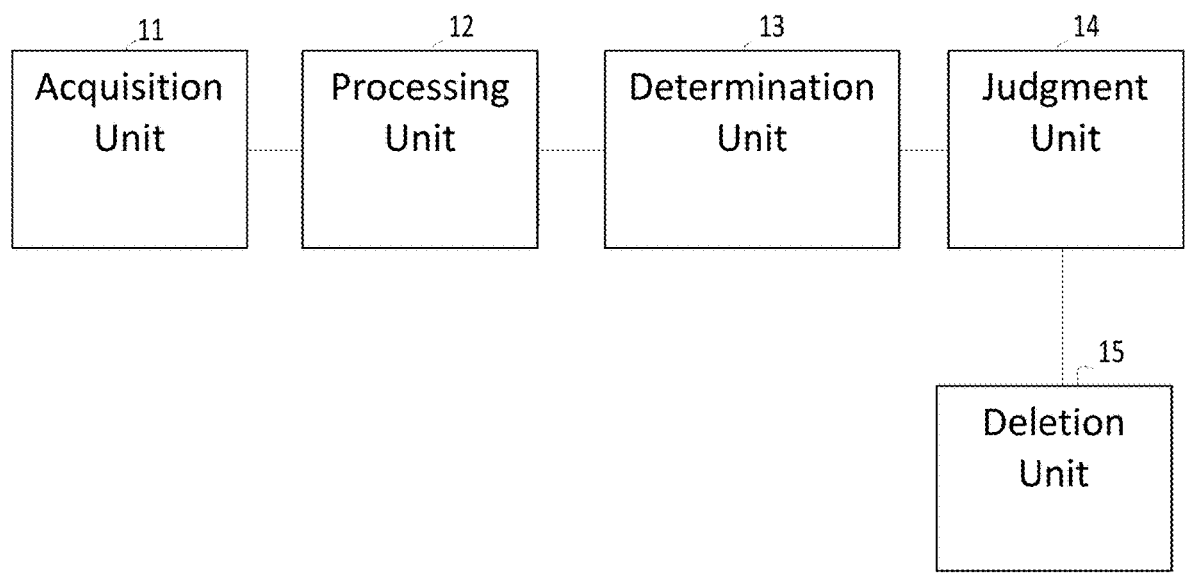
FIG. 8 is a schematic diagram illustrating a structure of an information processing device according to another embodiment of the disclosure.

On the basis of the foregoing contents, embodiments of the present application further provide an information processing device. FIG. 8 illustrates a schematic diagram of a structure of the information processing device according to some other embodiments of the disclosure. As shown in FIG. 8, the embodiments of the information processing device further include a deletion unit 15.

The deletion unit 15 is configured to delete the candidate depression region if the area of the candidate depression region is less than or equal to the area threshold.

The information processing device provided in this embodiments of the application disclosed herein can be used to implement the technical scheme of the embodiment of the method shown in FIG. 5. Because the implementation principle and technical effects are similar, the description thereof is not repeated herein.

Figure 9:
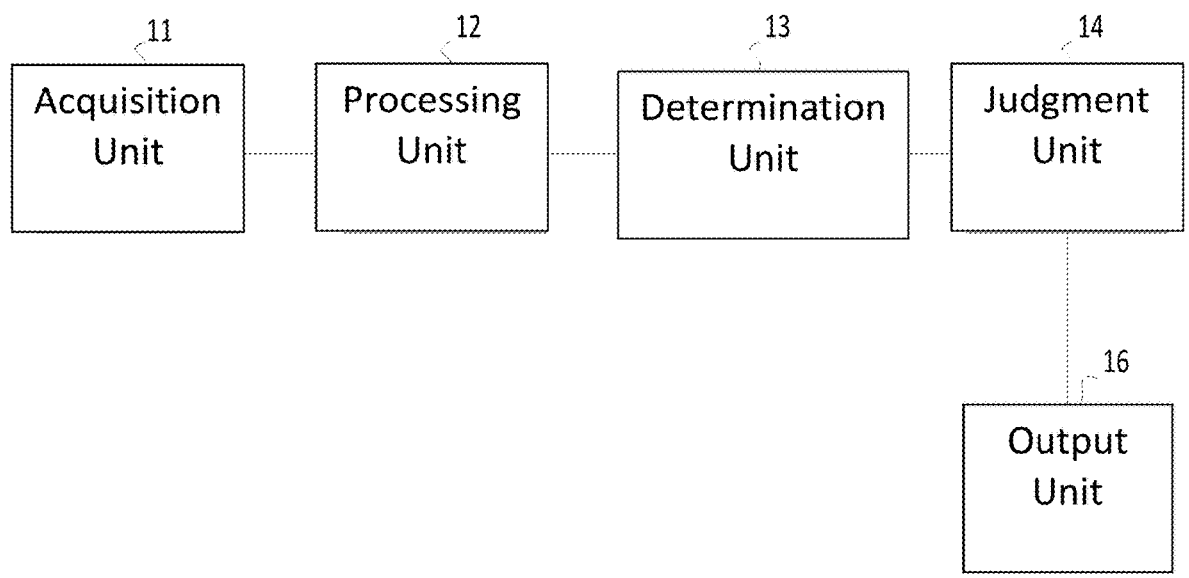
FIG. 9 is a schematic diagram illustrating a structure of an information processing device according to yet another embodiment of the disclosure.

On the basis of the contents that forego, embodiments of the present application further provide an information processing device. FIG. 9 shows a schematic diagram of a structure of the information processing device according to yet another embodiment of the present application. As shown in FIG. 9, the embodiment of the device further includes an output unit 16.

The output unit is configured to output a prompt message upon determining that the depth image contains a depression region.

The information processing device provided in the embodiment of the present application can be used to implement the technical scheme of the embodiment of the method shown in FIG. 6. Because the implementation principle and technical effects are similar, the description thereof is not repeated herein.

Figure 10:
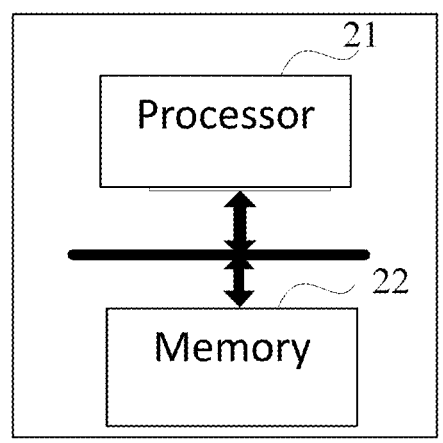
FIG. 10 is a schematic diagram of the cloud-based processing device provided by some embodiments of this application.

In order to realize the method described above, embodiments of this application further provide a cloud processing device. FIG. 10 is a schematic diagram of the cloud-based processing device provided by some embodiments of this application. As shown in FIG. 10, the cloud processing device includes a processor 21 and a memory 22. The memory 22 is configured to store instructions. When the instructions are executed by the processor 21, the device can execute any of the embodiments of the method as described above.

The cloud processing device provided in the embodiments of the present application can be used to implement the technical schemes of the method embodiments shown in any of FIGS. 1-6. Because the implementation principle and technical effects are similar, description thereof is not repeated herein.

In order to realize the method described above, embodiments of the present application also provide a computer program product which can be directly loaded into an internal memory of a computer and contains software codes. After the computer program is loaded and executed, the computer program can realize any of the embodiments of the method as described above.

The cloud processing device provided in the embodiment of the present application can be used to implement the technical scheme of the method embodiments shown in any of FIGS. 1-6. Because its implementation principle and technical effects are similar, description thereof is not repeated herein.

Persons of ordinary skills in the field can clearly understand that, for the convenience and simplicity of the description, the specific working processes of the system, device and units described above may refer to the corresponding processes in the embodiments of the method described above, and is not repeated herein.

In the several embodiments provided in this application, it should be understood that the system, device and method disclosed may be implemented in other ways. For example, the embodiments of the device described above are merely illustrative. In one example, the division of the units described above is only a logical functional division, and in actual practice, there may be other ways of division. For instance, multiple units or components can be combined or integrated into a system; some features can be ignored or not implemented. On the other hand, the coupling, direct coupling, or communicative connection shown or discussed above may be through some interfaces, or an indirect coupling between devices or units, which may be in an electrical, a mechanical, or other forms.

The "units" described above as separation components may or may not be physically separated, and the components displayed as a unit may or may not be a physical unit. That is, it may be located in one place or may be distributed over multiple network units. Some or all of the units can be selected according to actual needs to achieve the purpose of the present embodiments.

In addition, the functional units in the various embodiments of the present application may be integrated in one processing unit, or may be physically present as separate units, or may be integrated in one unit by two or more units. The above integrated units can be implemented either in the form of hardware or in the form of hardware plus software functional units.

The integrated unit realized in the form of software functional unit can be stored in a computer readable storage medium. The above software functional unit can be stored in a storage medium, including instructions for a computer device (i.e. a personal computer, a server, a network device, etc.) or a processor to perform some steps of the method described in the various embodiments of the present application. The aforementioned storage medium can include: a U disk, a mobile hard disk, a Read-Only Memory (ROM), a Random Access Memory (RAM), a disk or a CD, or another medium that can store program codes.

The above description represents only relatively better embodiments of this application, which are not intended to impose any limitations on this present disclosure. Any modifications, equivalent substitutions, improvements, etc., if made within the spirit and principles of this application, shall be included in the scope of protection of this application.

The invention claimed is:

1. An information processing method, comprising:
acquiring a depth image;
processing the depth image to obtain a means-by-row graph, and determining a road area in the depth image based on the means-by-row graph, wherein the means-by-row graph is obtained by performing average filtering on each row in the depth image;
determining a suspected depression region in the road area; and
judging over the suspected depression region based on a depression threshold to determine whether the depth image contains a depression region;
wherein the determining a suspected depression region in the road area comprises:
calculating row means in the road area;
establishing a band-stop filter; and
filtering the row means by means of the band-stop filter to thereby obtain the suspected depression region.

2. The method of claim 1, wherein the depth image is an image under a camera coordinate system, wherein the processing the depth image to obtain a means-by-row graph, and determining a road area in the depth image based on the means-by-row graph comprises:
performing a coordinate transformation over the depth image to thereby convert the camera coordinate system into a world coordinate system;
processing the depth image in the world coordinate system, and calculating row means in the depth image to thereby obtain a means-by-row graph;
processing the means-by-row graph to determine a suspected road area; and
judging over the suspected road area based on a preset position threshold of a main plane to determine the road area in the depth image.

3. The method of claim 1, wherein the judging over the suspected depression region based on a depression threshold to determine whether the depth image contains a depression region comprises:
preprocessing the suspected depression region;
extracting a contour of the suspected depression region and regarding the contour as a candidate depression region;
calculating an area of the candidate depression region; and
determining, if an area of the candidate depression region is larger than an area threshold, that the depth image contains a depression region.

4. The method of claim 3, further comprising:
deleting, if the area of the candidate depression region is less than or equal to the area threshold, the candidate depression region.

5. The method of claim 1, further comprising:
outputting a prompt message upon determining that the depth image contains a depression region.

6. The method of claim 2, wherein the processing the depth image in the world coordinate system, and calculating row means in the depth image to thereby obtain a means-by-row graph comprises:
performing a preprocessing over the depth image in the world coordinate system, wherein the preprocessing comprises at least one of smoothing, filtering, and denoising.

7. The method of claim 2, wherein in the judging over the suspected road area based on a preset position threshold of a main plane to determine the road area in the depth image, a selection strategy comprises:
selecting an area with a largest area and with a distance from a lowest position of the suspected road area to a lowest position of a depth map $Z_w$ not exceeding $\varepsilon_{rows}$, wherein:

$$\varepsilon_{rows} < 5\% \cdot H_{Zw};$$

where $\varepsilon_{rows}$ represents a threshold value for the position of the main plane, and $H_{Zw}$ represents a height of the depth map $Z_w$.

8. The method of claim 1, wherein the formula of the band-stop filter is as follows:

$$Z_{wGnd}(i, j) = \begin{cases} 0, & |Z_{wGnd}(i, j) - I_{rowsMeanGnd}(i)| \leq \delta \\ Z_{wGnd}(i, j), & |Z_{wGnd}(i, j) - I_{rowsMeanGnd}(i)| > \delta \end{cases}$$

where $Z_{wGnd}(i, j)$ is a depth value of the depth image corresponding to the road area at coordinates (i, j), and $I_{rowsMeanGnd}(i)$ is a mean value of the depth image corresponding to the road area at a row i; and $\delta$ is a preset level of tolerance for depressions on the road surface.

9. The method of claim 8, wherein $\delta$ is between [5, 30].

10. The method of claim 3, wherein the calculating an area of the candidate depression region comprises:
calculating an area of a rectangular box comprising XwR, XwL, ZwT, and ZwB to substitute the area of the candidate depression region, wherein:
XwR, and XwL correspond respectively to a right-most value and a left-most value of the candidate depression region along an Xw axis; and
ZwT and ZwB correspond respectively to an upper-most value and a lower-most value of the candidate depression region along an Zw axis.

11. The method of claim 3, wherein the area threshold is between [100 px, 400 px].

12. An information processing device, comprising:
a processor; and
a memory storing instructions, which, when executed by the processor, cause the processor to:
acquire a depth image;
process the depth image to obtain a means-by-row graph, and then to determine a road area in the depth image based on the means-by-row graph, wherein the means-by-row graph is obtained by performing average filtering on each row in the depth image;
determine a suspected depression region in the road area; and
judge over the suspected depression region based on the depression threshold to thereby determine whether the depth image contains a depression region;
wherein the processor is configured to:
calculate row means in the road area;
establish a band-stop filter; and
filter the row means by means of the band-stop filter to thereby obtain the suspected depression region.

13. The device of claim 12, wherein the depth image is an image under a camera coordinate system, wherein the processor is configured to:
perform a coordinate transformation over the depth image to thereby convert the camera coordinate system into a world coordinate system;
process the depth image in the world coordinate system, and calculate row means therein to thereby obtain a means-by-row graph;

process the means-by-row graph to determine a suspected road area; and judge over the suspected road area based on a preset position threshold of a main plane to determine the road area in the depth image.

14. The device of claim 12, wherein the processor is configured to:

preprocess the suspected depression region;

extract a contour of the suspected depression region and regard the contour as a candidate depression region;

calculate an area of the candidate depression region; and determine, if an area of the candidate depression region is larger than an area threshold, that the depth image comprises a depression region.

15. The device of claim 14, wherein the processor is further configured to delete, if the area of the candidate depression region is less than or equal to the area threshold, the candidate depression region.

16. The device of claim 12, wherein the processor is further configured to output a prompt message upon determining that the depth image comprises a depression region.

17. The device of claim 12, wherein the device is based on a cloud.

18. A non-transitory computer-readable storage medium, having computer program instructions stored thereon, wherein the program instructions, when being executed by a processor, are configured to perform the operations of:

acquiring a depth image;

processing the depth image to obtain a means-by-row graph, and determining a road area in the depth image based on the means-by-row graph, wherein the means-by-row graph is obtained by performing average filtering on each row in the depth image;

determining a suspected depression region in the road area; and judging over the suspected depression region based on a depression threshold to determine whether the depth image contains a depression region;

wherein the determining a suspected depression region in the road area comprises:

calculating row means in the road area;

establishing a band-stop filter; and filtering the row means by means of the band-stop filter to thereby obtain the suspected depression region.

* * * * *